United States Patent
Kim

(10) Patent No.: US 8,203,516 B2
(45) Date of Patent: Jun. 19, 2012

(54) LIQUID CRYSTAL DISPLAY

(75) Inventor: Seok-Woo Kim, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 12/343,671

(22) Filed: Dec. 24, 2008

(65) Prior Publication Data

US 2009/0207115 A1 Aug. 20, 2009

(30) Foreign Application Priority Data

Feb. 14, 2008 (KR) .......................... 10-2008-0013576

(51) Int. Cl.
*G09G 3/36* (2006.01)
(52) U.S. Cl. ................. 345/90; 345/88; 345/89; 349/74; 349/84; 349/143
(58) Field of Classification Search .................. None
See application file for complete search history.

(56) References Cited

U.S. PATENT DOCUMENTS

| | | | | |
|---|---|---|---|---|
| 2004/0263463 | A1* | 12/2004 | Yoo ................................ | 345/98 |
| 2006/0087488 | A1* | 4/2006 | Ito ................................. | 345/103 |
| 2007/0013854 | A1* | 1/2007 | Yoo et al. ....................... | 349/143 |
| 2007/0058123 | A1* | 3/2007 | Um et al. ....................... | 349/144 |
| 2007/0235730 | A1* | 10/2007 | Lee et al. ........................ | 257/40 |
| 2007/0285589 | A1* | 12/2007 | Song ................................. | 349/33 |
| 2008/0024689 | A1* | 1/2008 | Ahn ................................. | 349/43 |
| 2008/0043012 | A1* | 2/2008 | Shirai ............................ | 345/215 |
| 2008/0055222 | A1* | 3/2008 | Chen et al. ...................... | 345/90 |
| 2008/0094560 | A1* | 4/2008 | Baek ............................. | 349/144 |
| 2008/0106541 | A1* | 5/2008 | Yamazaki ...................... | 345/212 |
| 2008/0121890 | A1* | 5/2008 | Yang et al. ...................... | 257/66 |
| 2008/0165299 | A1* | 7/2008 | Huang et al. .................... | 349/38 |
| 2008/0174514 | A1* | 7/2008 | Yamazaki et al. .............. | 345/1.1 |
| 2009/0079767 | A1* | 3/2009 | Morita ........................... | 345/690 |
| 2009/0128472 | A1* | 5/2009 | Chen et al. ....................... | 345/88 |

FOREIGN PATENT DOCUMENTS

| | | |
|---|---|---|
| JP | 2006133577 | 5/2006 |
| KR | 1020040056970 | 7/2004 |
| KR | 1020060047024 | 5/2006 |

* cited by examiner

*Primary Examiner* — Joseph Feild
*Assistant Examiner* — Henok Heyi
(74) *Attorney, Agent, or Firm* — H.C. Park & Associates, PLC

(57) ABSTRACT

A liquid crystal display (LCD) includes a substrate, gate lines that extend in a first direction, data lines that cross the gate lines and extend in a second direction, and unit pixels. Each unit pixel includes a first subpixel electrode connected to an $i^{th}$ gate line by a first switching device, a second subpixel electrode connected to the $i^{th}$ gate line by a second switching device, and a third switching device including a drain electrode capacitively coupled to the second subpixel electrode and a source electrode connected to the first subpixel electrode. The third switching device is connected to an $(i+1)^{th}$ gate line, the first and second subpixel electrodes between the $i^{th}$ gate line and the $(i+1)^{th}$ gate line are arranged in an order opposite that of the first and second subpixel electrodes between the $(i+1)^{th}$ gate line and an $(i+2)^{th}$ gate line.

26 Claims, 8 Drawing Sheets

LIQUID CRYSTAL DISPLAY

CROSS REFERENCE TO RELATED APPLICATION

This application claims priority from and the benefit of Korean Patent Application No. 10-2008-0013576, filed on Feb. 14, 2008, which is hereby incorporated by reference for all purposes as if fully set forth herein.

BACKGROUND OF THE INVENTION

1. Field of the Invention

The present invention relates to a liquid crystal display (LCD), and more particularly, to an LCD that may have a minimum defect rate and may be easily repaired.

2. Discussion of the Background

As modern society becomes more dependent on sophisticated information and communication technology, the need for larger and thinner displays is growing. In particular, since conventional cathode ray tubes (CRTs) have failed to fully satisfy these market needs, the demand for flat panel displays (FPDs), such as plasma display panels (PDPs), plasma address liquid crystal display panels (PALCs), liquid crystal displays (LCDs), and organic light emitting diodes (OLEDs), is increasing dramatically.

LCDs are one of the most widely used FPDs. An LCD includes two substrates, on which electrodes are disposed, and a liquid crystal layer disposed between the two substrates. The alignment of liquid molecules of the liquid crystal layer is altered when voltages are applied to the electrodes and thus, the amount of light transmitted may be controlled. In this way, the LCD displays a desired image.

In order to enhance the lateral visibility of an LCD, each pixel may be split into two subpixel electrodes, and the subpixel electrodes may be capacitively coupled to each other. Then, different voltages may be applied to the subpixel electrodes.

A complicated manufacturing process including a photolithography process and an etching process may be performed on a thin-film transistor (TFT) array substrate of the LCD to form gate lines, data lines, and pixel electrodes. Here, the disposition of each element of the LCD may determine a defect rate in the manufacturing process.

Thus, the dispositions of elements, such as the gate lines, the data lines, and source and drain electrodes of TFTs, should be optimized in order to reduce the defect rate in the manufacturing process.

SUMMARY OF THE INVENTION

The present invention provides a liquid crystal display (LCD) that may have a minimum defect rate and may be easily repaired.

Additional features of the invention will be set forth in the description which follows, and in part will be apparent from the description, or may be learned by practice of the invention.

The present invention discloses an LCD including a substrate, a plurality of gate lines that extend in a first direction on the substrate, a plurality of data lines that cross the gate lines and extend in a second direction, and a plurality of unit pixels defined by the gate lines and the data lines. Each unit pixel includes a first subpixel electrode connected to an $i^{th}$ gate line by a first switching device, a second subpixel electrode connected to the $i^{th}$ gate line by a second switching device that is adjacent to the first switching device and spaced apart from the first subpixel electrode, and a third switching device that including a drain electrode capacitively coupled to the second subpixel electrode and a source electrode connected to the first subpixel electrode. The third switching device is connected to an $(i+1)^{th}$ gate line that is adjacent to the $i^{th}$ gate line. The first and second subpixel electrodes between the $i^{th}$ gate line and the $(i+1)^{th}$ gate line are arranged in an order opposite that of the first and second subpixel electrodes between the $(i+1)^{th}$ gate line and an $(i+2)^{th}$ gate line.

The present invention also discloses an LCD including a plurality of unit pixels defined by a plurality of gate lines and a plurality of data lines arranged in a lattice on an insulating substrate. Each unit pixel includes a first subpixel electrode connected to an $i^{th}$ gate line by a first switching device, a second subpixel electrode connected to the $i^{th}$ gate line by a second switching device that is adjacent to the first switching device and spaced apart from the first subpixel electrode, and a third switching device including a drain electrode capacitively coupled to the second subpixel electrode, a source electrode connected to the first subpixel electrode, and a gate electrode connected to an $(i+1)^{th}$ gate line. The unit pixels include a first unit pixel and second unit pixel. In the first unit pixel the first and second switching devices are connected to a $j^{th}$ data line, and in the second unit pixel the first and second switching devices are connected to a $(j+1)^{th}$ data line. The first and second subpixel electrodes of the first unit pixel are arranged in an order opposite that of the first and second subpixel electrodes of the second unit pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
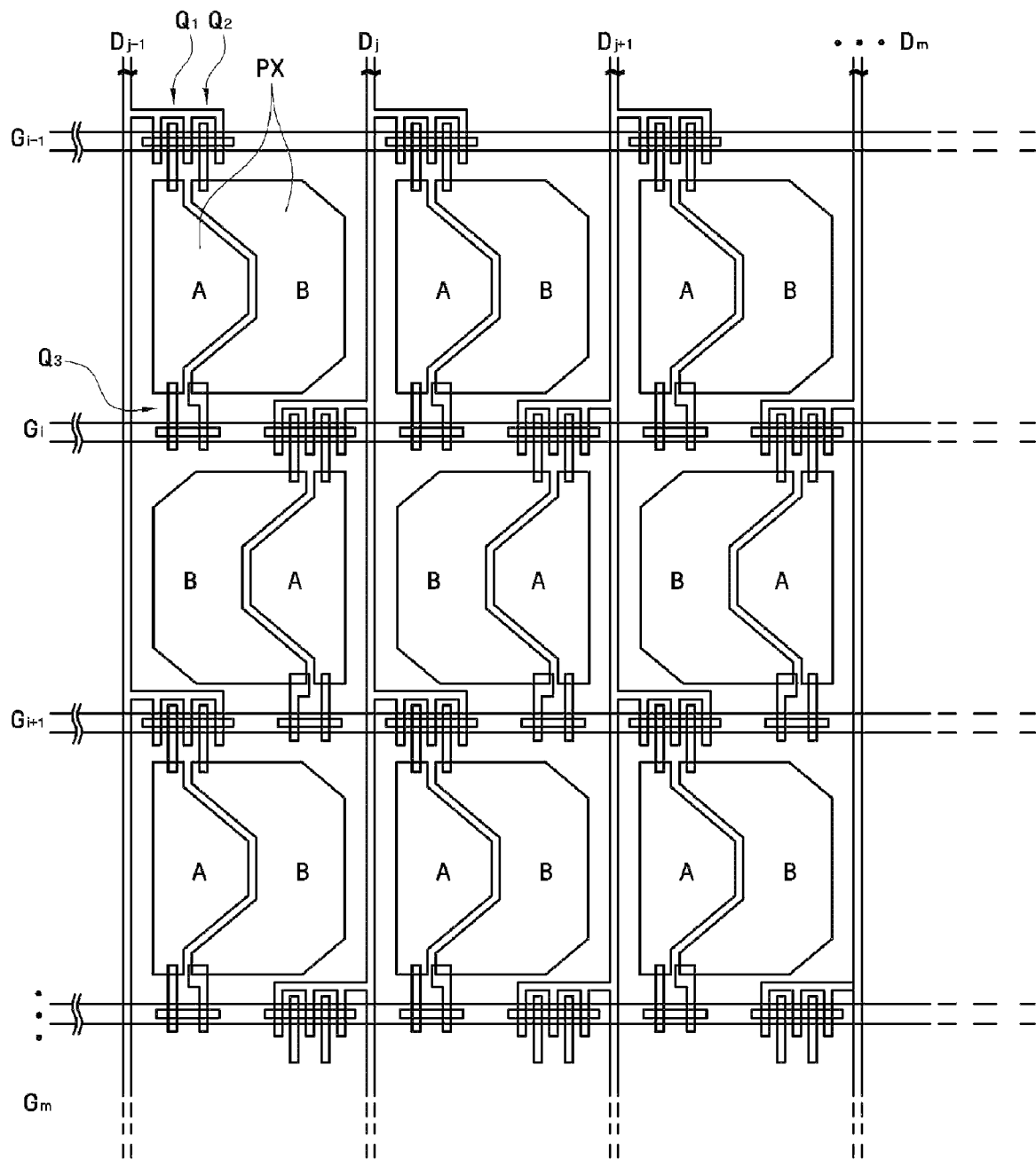
FIG. 1 schematically shows a pixel array of a liquid crystal display (LCD) according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layer and regions may be exaggerated for clarity. Like reference numerals in the drawings denote like elements.

It will be understood that when an element or layer is referred to as being "on" or "connected" to another element or layer, the element or layer can be directly on or directly connected to another element or layer, or intervening elements or layers. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, a liquid crystal display (LCD) according to an exemplary embodiment of the present invention will be described in detail with reference to the attached drawings. FIG. 1 schematically shows a pixel array of an LCD according to an exemplary embodiment of the present invention.

Referring to FIG. 1, the LCD according to the present exemplary embodiment includes a plurality of gate lines $G_1$ through $G_n$ and a plurality of data lines $D_1$ through $D_m$, which are arranged in a lattice and define pixels. The pixels are composed of unit pixels PX. Each unit pixel PX is partitioned into a first subpixel A and a second subpixel B and includes first, second, and third switching devices that control the first subpixel A and the second subpixel B. The first, second, and third switching devices may be first, second, and third thin-film transistors (TFTs) $Q_1$, $Q_2$, and $Q_3$.

The unit pixels PX are regions surrounded by the gate lines $G_1$ through $G_n$ and the data lines $D_1$ through $D_m$, which are arranged in a lattice. Each unit pixel PX is partitioned into two subpixels, that is, the first and second subpixels A and B, in order to improve visibility. The first subpixel A of each unit pixel PX is controlled by the first TFT $Q_1$, and the second subpixel B thereof is controlled by the second TFT $Q_2$. In addition, the third TFT $Q_3$ is connected to the first subpixel A or the second subpixel B. The third TFT $Q_3$ is connected to a voltage-up capacitor or a voltage-down capacitor, which will be described in detail below, in order to raise or lower the voltages charged in the first subpixel A and the second subpixel B.

The same data voltage is applied to the first and second subpixels A and B of each unit pixel PX by the first and second TFTs $Q_1$ and $Q_2$, respectively. Then, the voltages of the first and second subpixels A and B are raised or lowered by the third TFT $Q_3$, so that different voltages are stored in the first and second subpixels A and B. The specific operation of each element will be described below.

The first and second subpixels A and B between an $i^{th}$ gate line $G_i$ and an $(i+1)^{th}$ gate line $G_{i+1}$ may be arranged in an order that is opposite that of the first and second subpixels A and B between the $(i+1)^{th}$ gate line $G_{i+1}$ and an $(i+2)^{th}$ gate line $G_{i+2}$.

If a unit pixel PX connected to a $j^{th}$ data line $D_j$ is a first unit pixel and a unit pixel PX connected to a $(j+1)^{th}$ data line $D_{j+1}$ is a second unit pixel, the first and second subpixels A and B of the first unit pixel may be arranged in the same order as that the first and second subpixels A and B of the second unit pixel of the same row of pixels.

The first and second TFTs $Q_1$ and $Q_2$ may be disposed on a side of the $j^{th}$ data line $D_j$ in a unit pixel PX between the $i^{th}$ gate line $G_i$ and the $(i+1)^{th}$ gate line $G_{i+1}$. Additionally, the first and second TFTs $Q_1$ and $Q_2$ may be disposed on the other side of the $j^{th}$ data line $D_j$ in a unit pixel PX between the $(i+1)^{th}$ gate line $G_{i-1}$ and the $(i+2)^{th}$ gate line $G_{i+2}$. That is, the position of the first and second TFTs $Q_1$ and $Q_2$, which branch off from a data line, may vary according to pixel line. In addition, the third switching device, i.e., the third TFT $Q_3$, of the unit pixel PX connected to the $i^{th}$ gate line $G_i$, and the first and second switching devices, i.e., the first and second TFTs $Q_1$ and $Q_2$, of the unit pixel PX connected to the $(i+1)^{th}$ gate line $G_{i+1}$, may be switched on or off in response to a gate voltage received from the same gate line (i.e., the $(i+1)^{th}$ gate line $G_{i+1}$).

Figure 2:
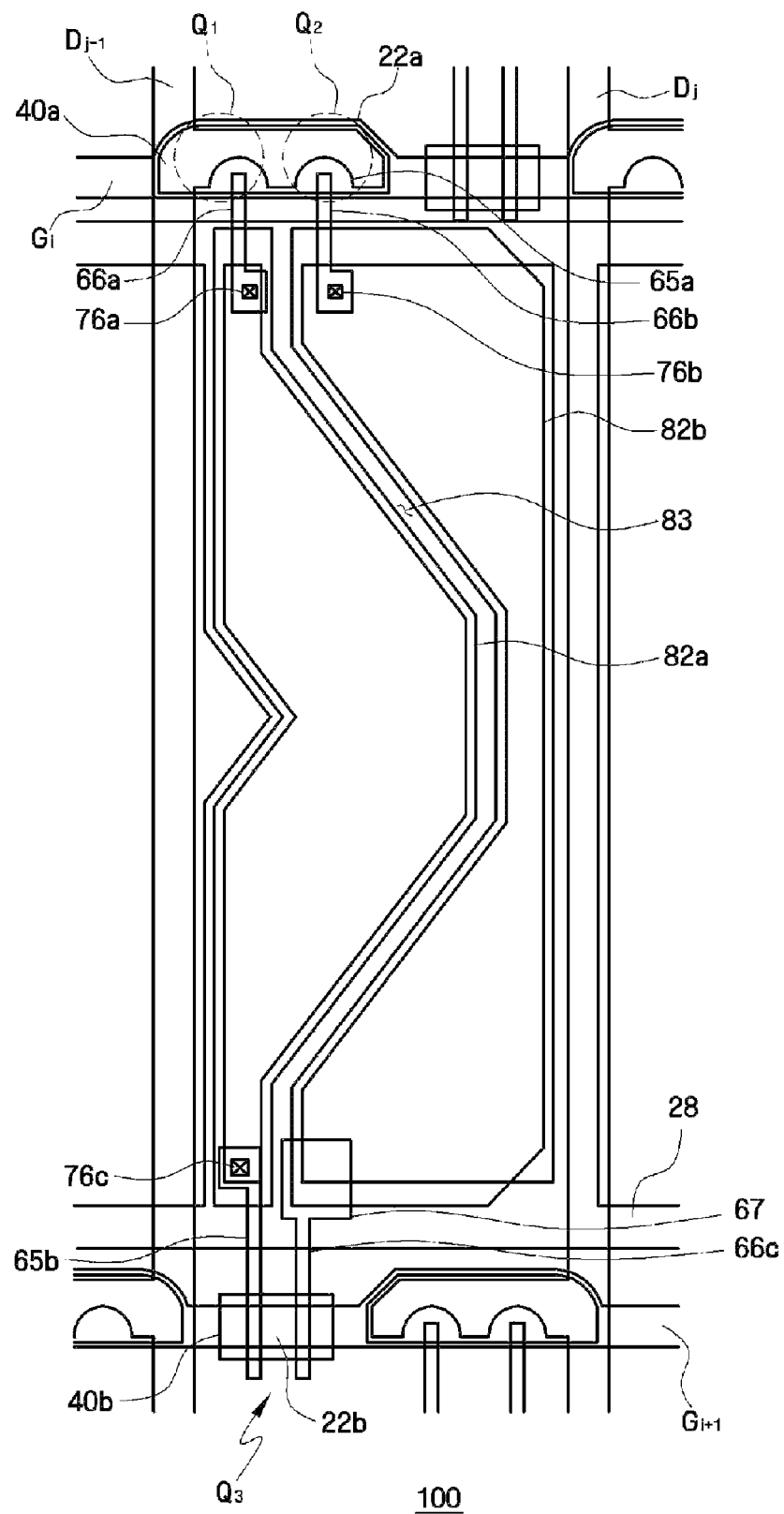
FIG. 2 is a plan view of a first display panel included in the LCD of FIG. 1.
Figure 3:
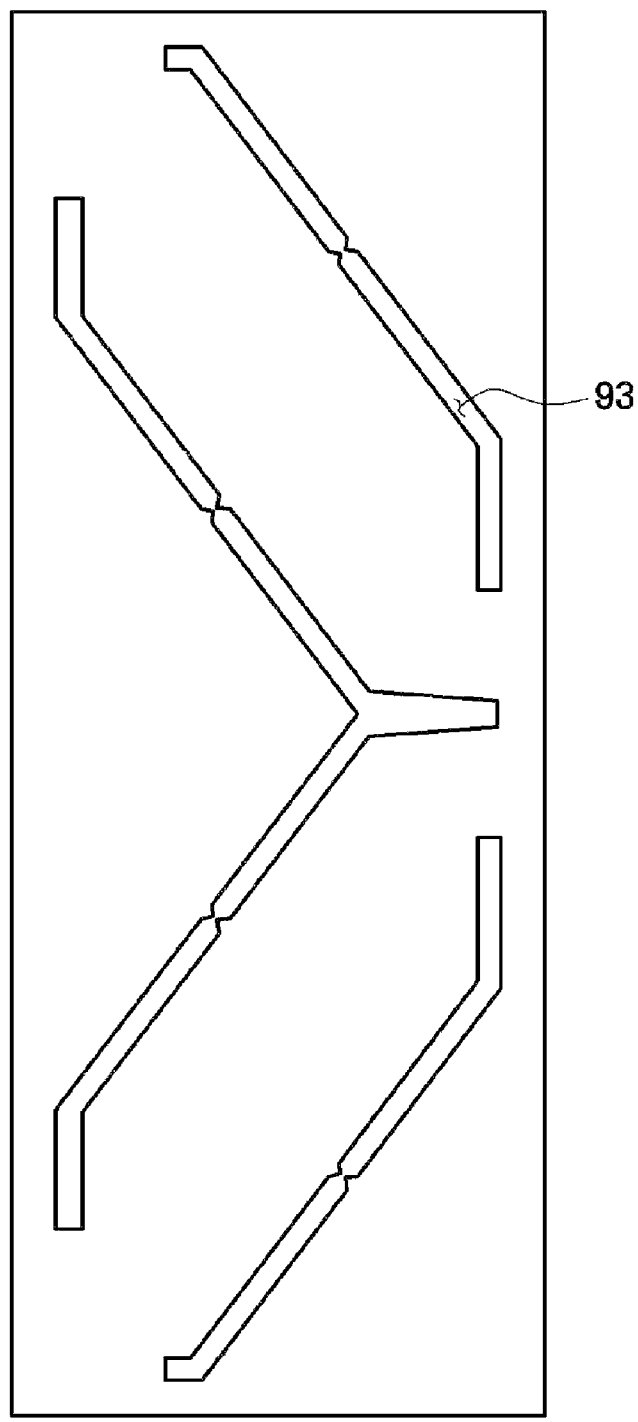
FIG. 3 is a plan view of a second display panel included in the LCD of FIG. 1.
Figure 3:
Figure 4:
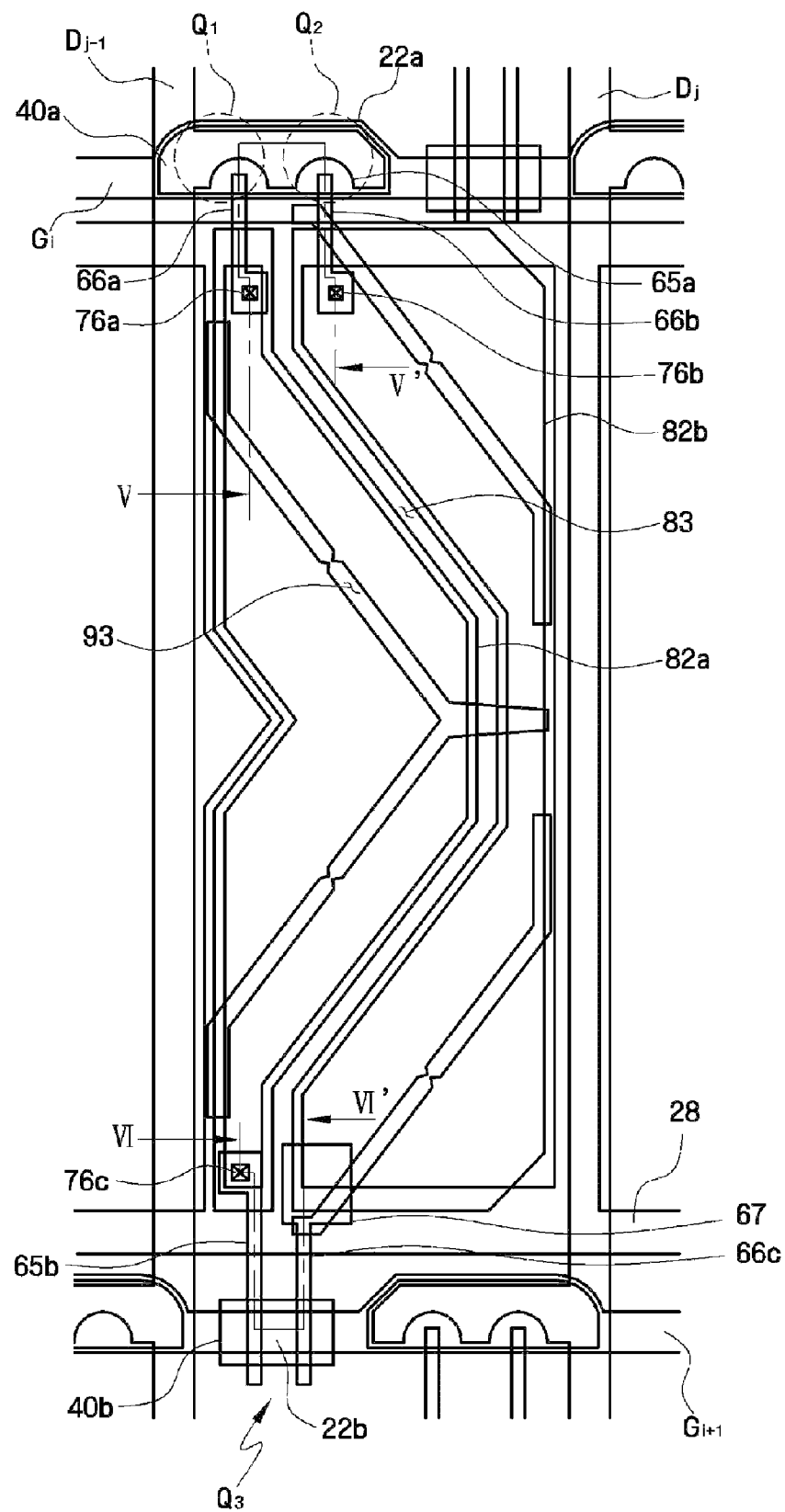
FIG. 4 is a plan view of the LCD of FIG. 1.
Figure 5:
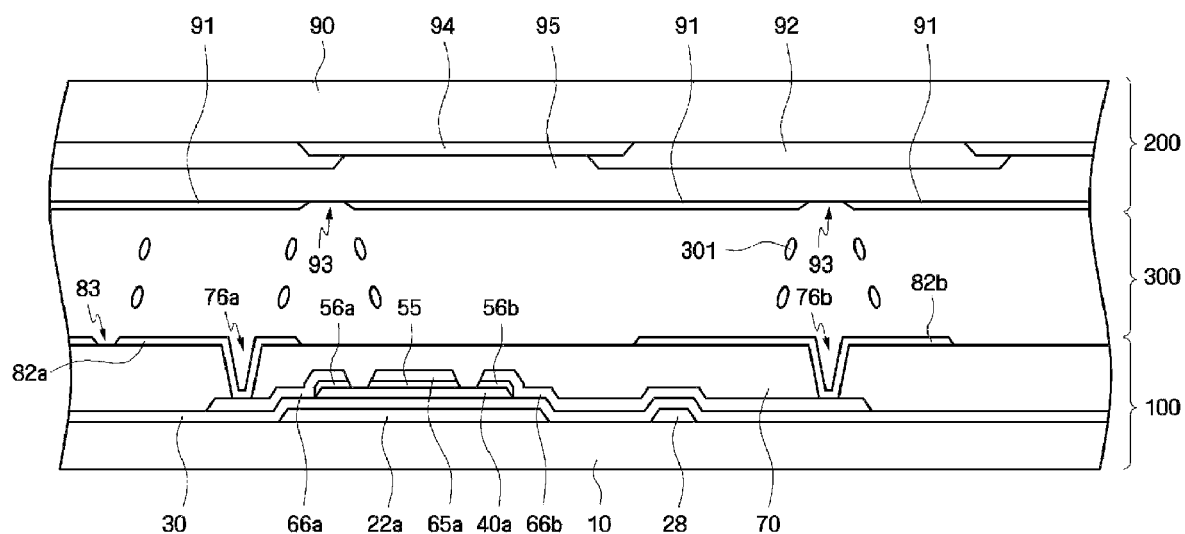
FIG. 5 is a cross-sectional view of the LCD taken along line V-V' of FIG. 4.
Figure 6:
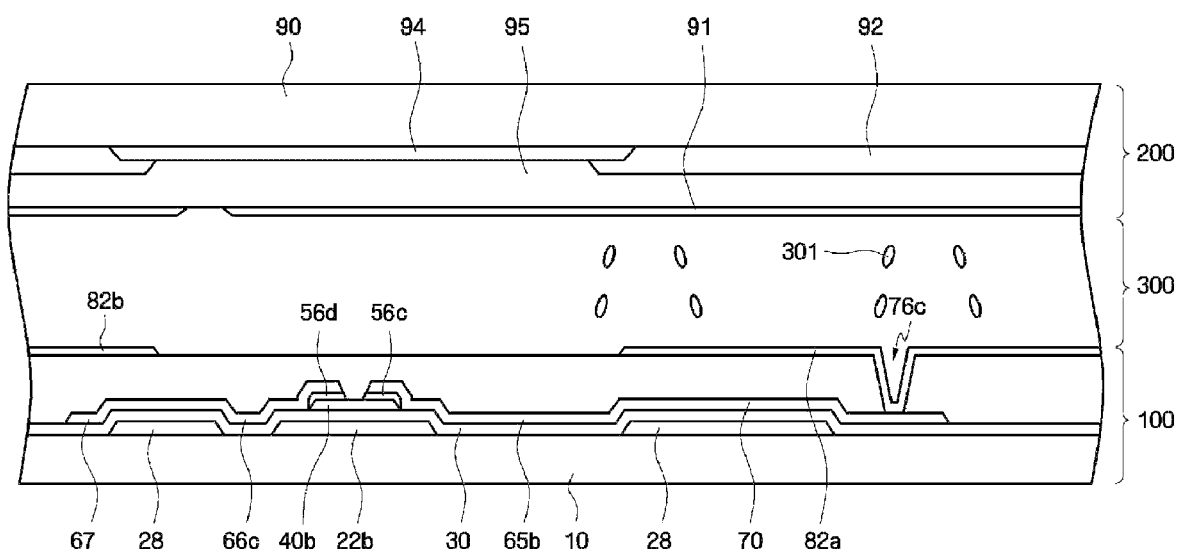
FIG. 6 is a cross-sectional view of the LCD taken along line VI-VI' of FIG. 4.

FIG. 2 is a plan view of a first display panel 100 included in the LCD of FIG. 1. FIG. 3 is a plan view of a second display panel 200 included in the LCD of FIG. 1. FIG. 4 is a plan view of the LCD of FIG. 1. FIG. 5 is a cross-sectional view of the LCD taken along line V-V' of FIG. 4. FIG. 6 is a cross-sectional view of the LCD taken along line VI-VI' of FIG. 4.

The first display panel 100 will now be described with reference to FIG. 2, FIG. 4, FIG. 5, and FIG. 6. Referring to FIG. 2, FIG. 4, FIG. 5, and FIG. 6, a first insulating substrate 10 is made of transparent glass or plastic. An $i^{th}$ gate line $G_i$ extends in a first direction on the first insulating substrate 10. The $i^{th}$ gate line $G_i$ includes a first gate electrode 22a and a second gate electrode 22b. The first gate electrode 22a and the second gate electrode 22b may extend from regions of the $i^{th}$ gate line $G_i$. However, the present invention is not limited thereto. Alternatively, a portion of the $i^{th}$ gate line $G_i$ that has uniform width may function as a first gate electrode 22a and a second gate electrode 22b.

The first and second gate electrodes 22a and 22b may be connected to adjacent gate lines. For example, the first gate electrode 22a may be connected to the $i^{th}$ gate line $G_i$, and the second gate electrode 22b may be connected to the $(i+1)^{th}$ gate line $G_{i-1}$. That is, two gate lines may be used to control one pixel PX. Thus, two gate lines may be allocated to one pixel. Alternatively, as in the present exemplary embodiment, one gate line may be allocated to one pixel, and a gate line of an adjacent pixel may be used as the second gate line.

A storage electrode line 28 is disposed on the first insulating substrate 10 on the same layer as the $i^{th}$ gate line $G_i$. The storage electrode line 28 may be disposed in various ways. A gate insulating film 30, which may be made of silicon nitride or silicon oxide, is stacked on the $i^{th}$ gate line $G_i$ and the storage electrode line 28. In addition, first and second semiconductor layers 40a and 40b, which may be made of hydrogenated amorphous silicon, are disposed on the gate insulating film 30. The first semiconductor layer 40a overlaps the first gate electrode 22a, and the second semiconductor layer 40b overlaps the second gate electrode 22b.

Data wiring is disposed on the first and second semiconductor layers 40a and 40b. The data wiring includes a $j^{th}$ data line $D_j$, a first source electrode 65a, a second source electrode 65b, a first drain electrode 66a, a second drain electrode 66b, and a third drain electrode 66c. The $j^{th}$ data line $D_j$ extends in a second direction. The $j^{th}$ data line $D_j$ and the $i^{th}$ gate line $G_i$ may cross each other and thus be arranged in a lattice on the first insulating substrate 10. In this case, the $j^{th}$ data line $D_j$ and the $i^{th}$ gate line $G_i$ may cross each other at an angle of 90 degrees, as shown, or at a different angle.

The first source electrode 65a may branch off from the $j^{th}$ data line $D_j$, and the first and second drain electrodes 66a and 66b may be adjacent to and spaced apart from the first source electrode 65a. The first and second drain electrodes 66a and 66b at least partially overlap the first gate electrode 22a. Thus, the first source electrode 65a, the first drain electrode 66a, and the first gate electrode 22a form three terminals of the first TFT $Q_1$, and the first source electrode 65a, the second drain electrode 66b, and first gate electrode 22a form three terminals of the second TFT $Q_2$. In the present specification, the first source electrode 65a, the first drain electrode 66a, the second drain electrode 66b, and the first gate electrode 22a are defined as two switching devices, i.e., the first and second TFTs $Q_1$ and $Q_2$. Alternatively, the first source electrode 65a, the first drain electrode 66a, the second drain electrode 66b, and the first gate electrode 22a may make up a single switching device that includes a source electrode and two drain electrodes controlled by a gate electrode.

The second source electrode 65b extends from the second semiconductor layer 40b toward a first subpixel electrode 82a. The third drain electrode 66c faces the second source electrode 65b and is spaced apart from the second source electrode 65b. The third drain electrode 66c may extend under a second subpixel electrode 82b. The second source electrode 65b may be connected to the first subpixel electrode 82a through a contact hole 76c, and the third drain electrode 66c may overlap the second subpixel electrode 82b to form a capacitor.

Ohmic contact layers 55, 56a, 56b, 56c, and 56d may be made of n+ hydrogenated amorphous silicon, which may be doped in high concentration, and are disposed between the first and second semiconductor layers 40a and 40b and the data wiring disposed on the first and second semiconductor layers 40a and 40b.

The third drain electrode 66c overlaps the storage electrode line 28 and may include a wide extension portion 67. The wide extension portion 67 of the third drain electrode 66c partially overlaps the storage electrode line 28 and the second subpixel electrode 82b, which will be described below. The wide extension portion 67 of the third drain electrode 66c overlaps the storage electrode line 28 to form a voltage-down capacitor and thus reduce an absolute value of a pixel voltage charged in the first subpixel electrode 82a, which will be described below. The wide extension portion 67 of the third drain electrode 66c also overlaps the second subpixel electrode 82b to form a voltage-up capacitor and thus increase an absolute value of a pixel voltage charged in the second subpixel electrode 82b. Therefore, even if the same grayscale data voltage is applied to the first and second subpixel electrodes 82a and 82b, voltages charged in the first and second subpixel electrodes 82a and 82b may be adjusted to have different values, which will be described in more detail below.

The first gate electrode 22a, the first source electrode 65a, and the first drain electrode 66a make up the first TFT $Q_1$, which uses the first semiconductor layer 40a as its channel portion. The first gate electrode 22a, the first source electrode 65a, and the second drain electrode 66b make up the second TFT $Q_2$, which also uses the first semiconductor layer 40a as its channel portion. In addition, the second gate electrode 22b, the second source electrode 65b, and the third drain electrode 66c make up the third TFT $Q_3$, which uses the second semiconductor layer 40b as its channel portion. As described above, the second gate electrode 22b, which is coupled to the third TFT $Q_3$ to drive the same pixel region as the first and second TFTs $Q_1$ and $Q_2$, is connected to the $(i+1)^{th}$ gate line $G_{i+1}$, which is adjacent to the $i^{th}$ gate line $G_i$ having the first gate electrode 22a connected thereto.

The first and second TFTs $Q_1$ and $Q_2$ are adjacent to each other, and the third TFT $Q_3$ faces the first and second TFTs $Q_1$ and $Q_2$ and is spaced from the first and second TFTs $Q_1$ and $Q_2$ with the first and second subpixel electrodes 82a and 82b interposed therebetween.

In addition, the first, second, and third switching devices, i.e. TFTs $Q_1$, $Q_2$, and $Q_3$, are connected to the $(i+1)^{th}$ gate line $G_{i+1}$. The third TFT $Q_3$ is spaced from the first and second TFTs $Q_1$ and $Q_2$ in the first direction and connected to a unit pixel which is adjacent thereto in the second direction. The first and second TFTs $Q_1$ and $Q_2$, which are connected to the $(i+1)^{th}$ gate line $G_{i+1}$, and the third TFT $Q_3$ may be arranged in an order opposite that of the first and second TFTs $Q_1$ and $Q_2$, which are connected to the $(i+2)^{th}$ gate line $G_{i+2}$, and the third TFT $Q_3$.

A passivation layer 70 may be disposed on the data wiring. The passivation layer 70 may be made of an inorganic material, such as silicon nitride, or an organic insulating material. Alternatively, the passivation layer 70 may include two or more layers made of both organic and inorganic materials. A contact hole 76b is formed in the passivation layer 70 to at least partially expose the second drain electrode 66b.

The first and second subpixel electrodes 82a and 82b may be made of a transparent conductive material, such as indium tin oxide (ITO) or indium zinc oxide (IZO), and are disposed on the passivation layer 70.

The first subpixel electrode 82a is connected to the first drain electrode 66a through the contact hole 76a and partially overlaps the storage electrode line 28. The second subpixel electrode 82b is connected to the second drain electrode 66b through the contact hole 76b and partially overlaps the storage electrode line 28. In addition, the first and second subpixel electrodes 82a and 82b are spaced apart from each other by a first slit 83, and the first slit 83 may overlap the storage electrode line 28.

The first slit 83 may cause the formation of a fringe field and defines domains in which liquid crystals move uniformly. An alignment film (not shown) may further be disposed on the first and second subpixel electrodes 82a and 82b. The alignment film may be, for example, a vertical alignment film. A portion of the second subpixel electrode 82b may be indented and tapered. That is, the second subpixel electrode 82b may have an indented portion. The first subpixel electrode 82a may be arranged in the indented portion of the second subpixel electrode 82b.

While the same data voltage is provided to the first and second subpixel electrodes 82a and 82b, since the second subpixel electrode 82b is coupled to the voltage-up capacitor, it is charged with a pixel voltage whose absolute value is higher than that of the provided data voltage. On the other hand, since the first subpixel electrode 82a is coupled to the voltage-down capacitor, it is charged with a pixel voltage having an absolute value that is lower than that of the provided data voltage. As described above, since the first and second subpixel electrodes 82a and 82b in the same pixel are charged with different voltages, the distortion of a gamma curve may be prevented, and lateral visibility may be enhanced.

In the present exemplary embodiment, when the voltage charged in the first subpixel electrode 82a is reduced, the voltage charged in the second subpixel electrode 82b is increased. Therefore, the difference between the voltages charged in the first and second subpixel electrodes 82a and 82b increases. That is, a greater voltage difference can be obtained when both the voltage-up capacitor and the voltage-down capacitor are available than when only the voltage-down capacitor is available, even if the capacitance of each capacitor is small. When the voltage-up capacitor and the voltage-down capacitor are available, the size of the third drain electrode 66c, which is an electrode of the voltage-up capacitor and the voltage-down capacitor, may be reduced, which, in turn, may improve the aperture ratio. In addition, since the voltage-up capacitor increases voltages, a transmission rate may be increased.

The second display panel 200 will now be described with reference to FIG. 3, FIG. 4, FIG. 5, and FIG. 6. Referring to FIG. 3, FIG. 4, FIG. 5, and FIG. 6, like the first insulating substrate 10, a second insulating substrate 90, which is a base substrate of the second display panel 200, may be made of transparent glass or plastic. A black matrix 94 is disposed on the second insulating substrate 90 and overlaps the $i^{th}$ gate line $G_i$ and the $j^{th}$ data line $D_j$ of the first display panel 100. In addition, a color filter 92 is disposed in a region surrounded by the black matrix 94. The color filter 92 overlaps the first and second subpixel electrodes 82a and 82b of the first display panel 100.

An overcoat layer 95 is disposed on the black matrix 94 and the color filter 92 to planarize their step heights.

A common electrode 91 may be made of a transparent conductive material, such as ITO or IZO, and is disposed on the overcoat layer 95. The common electrode 91 is disposed on a whole surface of the second display panel 200 and includes a second slit 93 in each pixel unit PX. The second slit 93 causes the formation of a fringe field together with the first slit 83 interposed between the first and second subpixel electrodes 82a and 82b of the first display panel 100 and defines domains in which liquid crystals move uniformly. In addition, an alignment film (not shown) may further be disposed on the common electrode 91. The alignment film may be a vertical alignment film.

Referring to FIG. 5 and FIG. 6, a liquid crystal layer 300 including a plurality of liquid crystals 301 is disposed between the first display panel 100 and the second display panel 200. When no electric field is generated in the LCD, the liquid crystals 301 may be, for example, vertically aligned according to characteristics of the alignment film included in the LCD. However, when voltages are applied to the first and second subpixel electrodes 82a and 82b of the first display panel 100 and the common electrode 91 of the second display panel 200, an electric field is formed in the liquid crystal layer 300, thereby rotating the liquid crystals 301.

In this case, if the liquid crystals 301 included in the liquid crystal layer 300 have negative dielectric anisotropy, they rotate in a direction perpendicular to the electric field. If the liquid crystals 301 have positive dielectric anisotropy, they rotate in a direction parallel to the electric field. The degree of rotation of the liquid crystals 301 determines the transmission of light through the liquid crystal layer 300. If a polarizer (not shown) is attached to an outer side of the first display panel 100 and/or the second display panel 200, the overall transmission rate of the LCD may be controlled using the polarizer.

As described above, the first slit 83 of the first display panel 100 and the second slit 93 of the second display panel 200 create a fringe field in the LCD according to the present exemplary embodiment. Thus, the rotation of the liquid crystals 301 caused by the generation of the electric field has certain directionality in each domain partitioned by the first and second slits 83 and 93. As a result, visibility may be enhanced, and texture created by the collision of the liquid crystals 301 may be prevented. Furthermore, the speed of rotation of the liquid crystals 301, that is, the reaction speed of the liquid crystals 310 to the electric field, may be increased.

Figure 7:
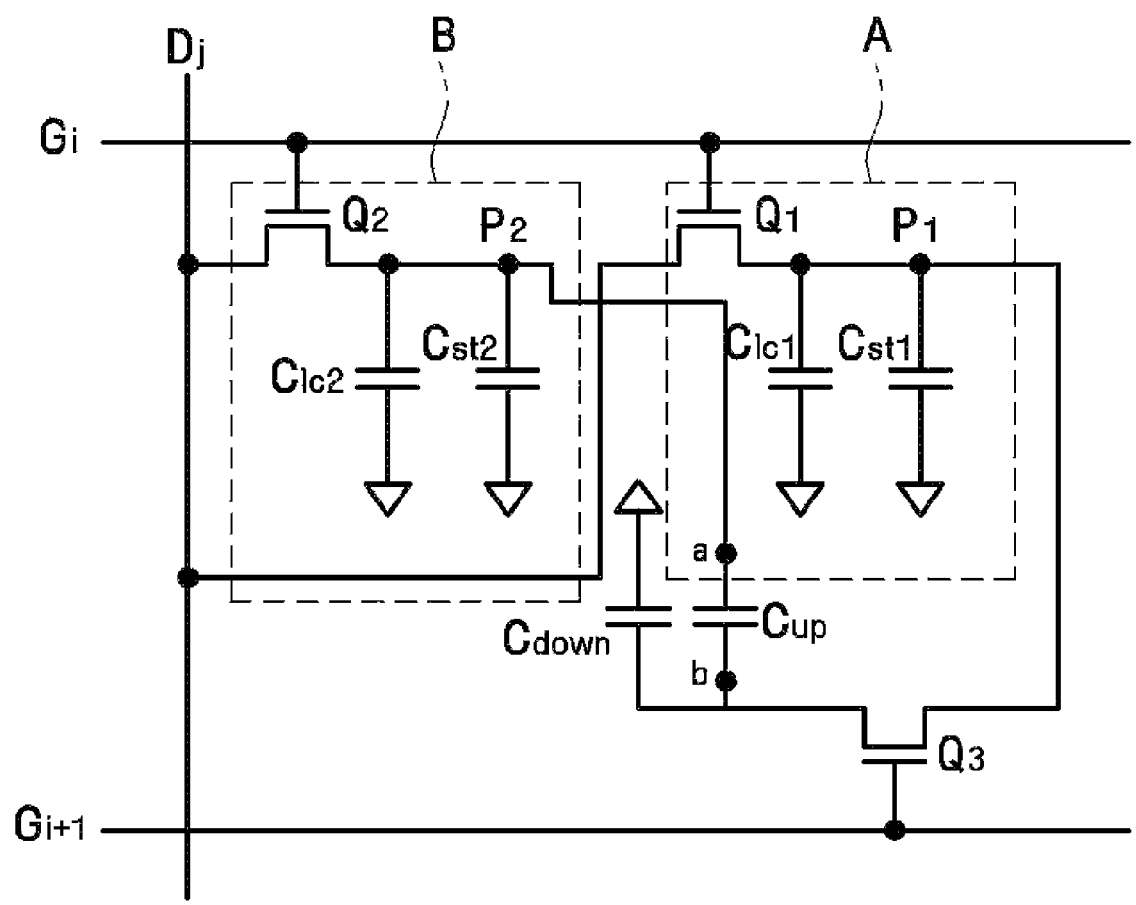
FIG. 7 is an equivalent circuit diagram of the LCD of FIG. 1.
Figure 8:
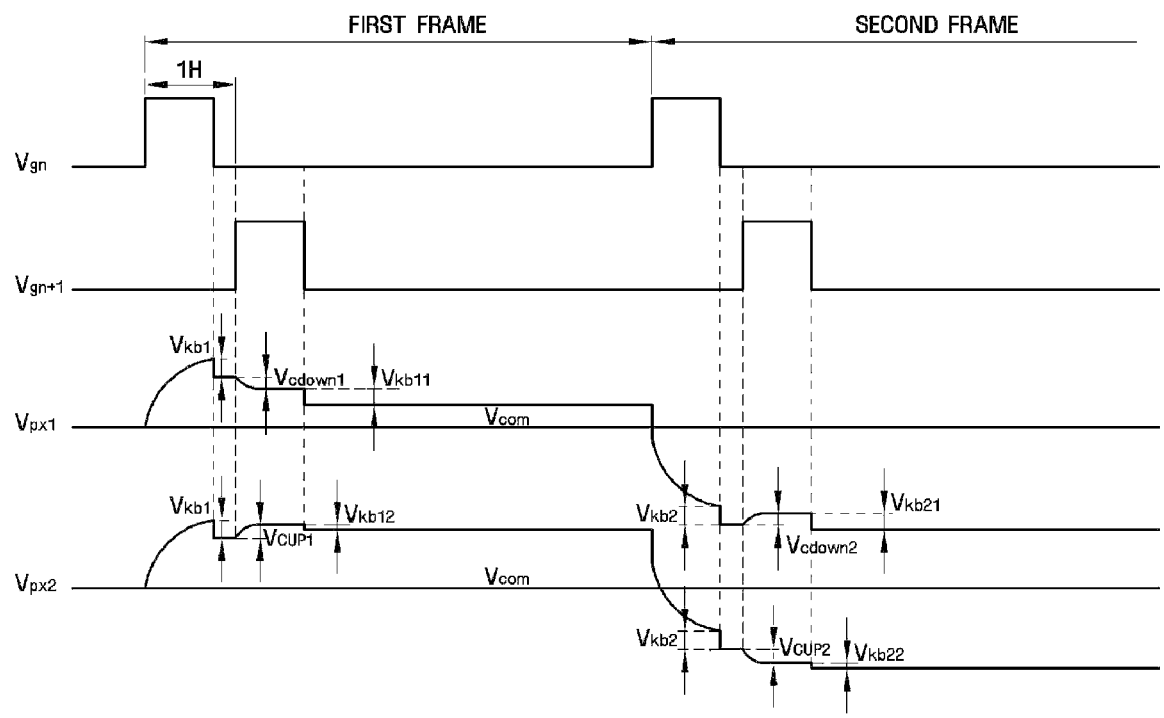
FIG. 8 shows waveforms of voltages which are applied to the LCD of FIG. 1.

FIG. 7 is an equivalent circuit diagram of the LCD of FIG. 1. FIG. 8 shows waveforms of voltages which are applied to the LCD of FIG. 1. FIG. 7 shows a circuit diagram of a pixel region located between the $i^{th}$ gate line $G_i$ and the $(i+1)^{th}$ gate line $G_{i+1}$ as an example. In FIG. 7, reference character 'A' indicates a first subpixel electrode region, and reference character 'B' indicates a second subpixel electrode region.

For simplicity, it is assumed that a common voltage Vcom applied to the storage electrode line 28 and the common electrode 91 is 5 V, that a data voltage of 7 V is applied during a first frame, and that a data voltage of 3 V is applied during a second frame. While a data voltage of 7 V is being applied to the $j^{th}$ data line $D_j$, if a gate-on signal is transmitted to the $i^{th}$ gate line $G_i$, the first and second TFTs $Q_1$ and $Q_2$ are turned on. Accordingly, the data voltage of 7 V is applied to the first and second subpixel electrodes 82a and 82b. Since the first and second TFTs $Q_1$ and $Q_2$ are connected to the same data line, i.e., the $j^{th}$ data line $D_j$, a voltage applied to a node $P_1$, which is connected to the first subpixel electrode 82a, is equal to a voltage applied to a node $P_2$, which is connected to the second subpixel electrode 82b. That is, while the gate-on signal is transmitted to the $i^{th}$ gate line $G_i$, subpixel voltages Vpx1 and Vpx2 of 7 V are provided to the nodes $P_1$ and $P_2$, respectively. Here, a first liquid crystal capacitor Clc1, a first storage capacitor Cst1, a second liquid crystal capacitor Clc2, and a second storage capacitor Cst2 are charged with 2 V, which is the difference between the subpixel voltages Vpx1 and Vpx2 and the common voltage Vcom.

Meanwhile, a voltage of 7 V is also applied to a node that is connected to the node $P_2$. Since inversion driving is performed on a frame-by-frame basis in the present exemplary embodiment, if approximately 3 V is applied to a node b during a previous frame, a voltage-up capacitor Cup between the nodes a and b is charged with approximately +4 V, and a voltage-down capacitor Cdown is charged with approximately +2 V.

If a gate-off voltage is applied to the $i^{th}$ gate line $G_i$, the first and second TFTs $Q_1$ and $Q_2$ are turned off, and the subpixel voltages Vpx1 and Vpx2 charged in the first and second subpixel electrodes 82a and 82b, respectively, are reduced by a first kickback voltage Vkb1.

Referring to FIG. 8, the voltage of the $i^{th}$ gate line $G_i$ is Vgn and the voltage of the $(i+1)^{th}$ gate line $G_{i+1}$ is Vgn+1. When a first horizontal period 1H passes after the gate-on voltage is applied to the $i^{th}$ gate line $G_i$, the gate-on voltage is applied to the $(i+1)^{th}$ gate line $G_{i+1}$, and the third TFT $Q_3$ connected to the $(i+1)^{th}$ gate line $G_{i+1}$, is turned on. As the third TFT $Q_3$ is turned on, the nodes $P_1$ and b are connected to each other. Thus, a voltage of 7 V is provided to the node b. Here, since the voltage-up capacitor Cup is charged with approximately +4 V, the voltage of the node $P_2$ instantaneously increases. On the other hand, since the voltage-down capacitor Cdown is charged with approximately +2 V and has an end connected to the storage electrode line 28, the voltage of the node b instantaneously drops. Therefore, the subpixel voltage Vpx2 charged in the second subpixel electrode 82b instantaneously increases (as indicated by reference numeral Vcup1 in FIG. 8) because the second subpixel electrode 82b is coupled to the voltage-up capacitor Cup. In addition, the subpixel voltage Vpx1 charged in the first subpixel electrode 82a instantaneously decreases (as indicated by reference numeral Vcdown1 in FIG. 8) because the first subpixel electrode 82a is coupled to the voltage-down capacitor Cdown.

If the gate-off voltage is applied to the $(i+1)^{th}$ gate line $G_{i+1}$, the subpixel voltage Vpx2 charged in the second subpixel electrode 82b is slightly reduced by a second kickback voltage Vkb12, and the subpixel voltage Vpx1 charged in the first subpixel electrode 82a is further reduced by a second kickback voltage Vkb11. During the first frame, the first and second subpixel electrodes 82a and 82b sustain the subpixel voltages Vpx1 and Vpx2 charged therein.

As described above, even if the same voltage is applied to the first and second subpixel electrodes 82a and 82b during the first frame, since the subpixel voltage Vpx1 of the first subpixel electrode 82a is reduced while the subpixel voltage Vpx2 of the second subpixel electrode 82b is increased, the second subpixel electrode 82b may be charged with a higher voltage than the first subpixel electrode 82a. That is, the absolute value of the voltage charged in the second liquid crystal capacitor Clc2 and the second storage capacitor Cst2 of the second subpixel electrode region B may become higher than that of the voltage charged in the first liquid crystal capacitor Clc1 and the first storage capacitor Cst1 of the first subpixel electrode region A.

Next, the subpixel voltages Vpx1 and Vpx2 charged in the first and second subpixel electrodes 82a and 82b, respectively, during a second frame will be described. While a data voltage of 3 V is being applied to the $j^{th}$ data line $D_j$, if the gate-on signal is transmitted again to the $i^{th}$ gate line $G_i$ when the second frame begins, the first and second TFTs $Q_1$ and $Q_2$ are turned on. Accordingly, the data voltage of 3 V is applied to the first and second subpixel electrodes 82a and 82b. While the gate-on signal is transmitted to the $i^{th}$ gate line $G_i$, the subpixel voltages Vpx1 and Vpx2 of 3 V are provided to the nodes $P_1$ and $P_2$, respectively. Here, the first liquid crystal capacitor Clc1, the first storage capacitor Cst1, the second liquid crystal capacitor Clc2, and the second storage capacitor Cst2 are charged with −2 V, which is the difference between the subpixel voltages Vpx1 and Vpx2 and the common voltage Vcom.

Meanwhile, a voltage of 3 V is also applied to the node that is connected to the node $P_2$. Since approximately 7 V was applied to the node b during the first frame, the voltage-up capacitor Cup between the nodes a and b is charged with approximately −4 V, and the voltage-down capacitor Cdown is charged with approximately −2 V.

If the gate-off voltage is applied to the $i^{th}$ gate line $G_i$, the first and second TFTs $Q_1$ and $Q_2$ are turned off, and the subpixel voltages Vpx1 and Vpx2 charged in the first and second subpixel electrodes 82a and 82b, respectively, are reduced by a first kickback voltage Vkb2.

After the first horizontal period 1H, if the gate-on voltage is applied to the $(i+1)^{th}$ gate line $G_{i+1}$, the third TFT $Q_3$ connected to the $(i+1)^{th}$ gate line $G_{i+1}$ is turned on. When the third TFT $Q_3$ is turned on, the nodes $P_1$ and b are connected to each other. Thus, a voltage of 3 V is provided to the node b. Here, since the voltage-up capacitor Cup is charged with approximately −4 V, the voltage of the node $P_2$ instantaneously drops. On the other hand, since the voltage-down capacitor Cdown is charged with approximately −2 V and has an end connected to the storage electrode line 28, the voltage of the node b instantaneously increases. Therefore, the subpixel voltage Vpx2 charged in the second subpixel electrode 82b instantaneously decreases (as indicated by reference numeral Vcup2 in FIG. 8) because the second subpixel electrode 82a is coupled to the voltage-up capacitor Cup. In addition, the subpixel voltage Vpx1 charged in the first subpixel electrode 82a instantaneously increases (as indicated by reference numeral Vcdown2 in FIG. 8) because the first subpixel electrode 82b is coupled to the voltage-down capacitor Cdown.

If the gate-off voltage is applied to the $(i+1)^{th}$ gate line $G_{i+1}$, the subpixel voltage Vpx1 charged in the first subpixel electrode 82a is reduced by a second kickback voltage Vkb21, and the subpixel voltage Vpx2 charged in the second subpixel electrode 82b is further reduced by a second kickback voltage Vkb22. During the second frame, the first and second subpixel electrodes 82a and 82b sustain the subpixel voltages Vpx1 and Vpx2 charged therein.

As described above, even if the same voltage is applied to the first and second subpixel electrodes 82a and 82b during the second frame, since the subpixel voltage Vpx1 of the first subpixel electrode 82a is increased while the subpixel voltage Vpx2 of the second subpixel electrode 82b is reduced, the second subpixel electrode 82b may be charged with a lower voltage than the first subpixel electrode 82a. That is, during the second frame, the absolute value of the voltage charged in the second liquid crystal capacitor Clc2 and the second storage capacitor Cst2 of the second subpixel electrode region B may become higher than that of the voltage charged in the first liquid crystal capacitor Clc1 and the first storage capacitor Cst1 of the first subpixel electrode region A.

Figure 9:
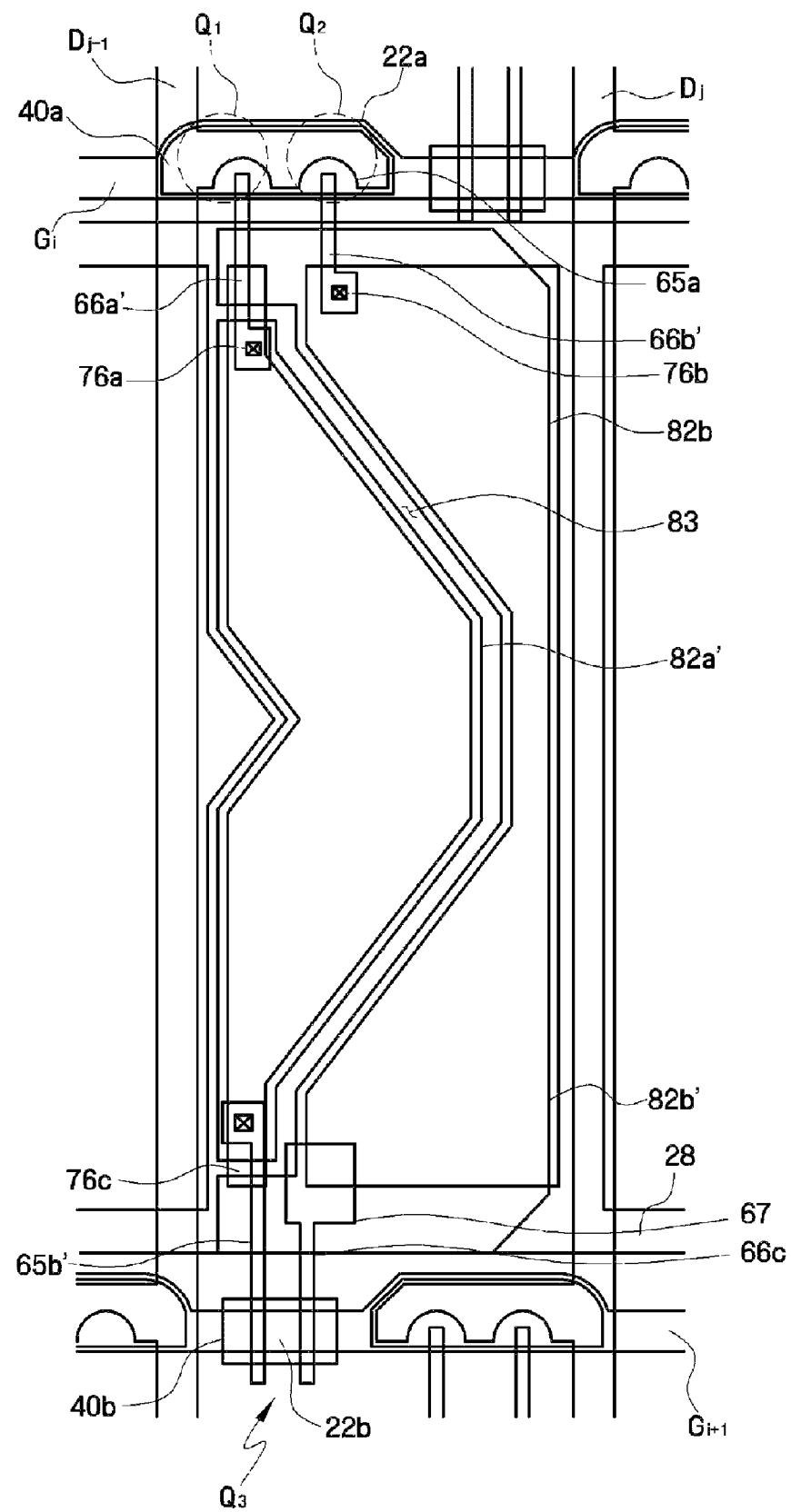
FIG. 9 is a plan view of an LCD according to another exemplary embodiment of the present invention.

Hereinafter, an LCD according to another exemplary embodiment of the present invention will be described in detail with reference to FIG. 9. FIG. 9 is a plan view of an LCD according to another exemplary embodiment of the present invention. For the simplicity of description, elements substantially identical to those of the previous exemplary embodiment are indicated by like reference numerals, and thus their description will be omitted.

In the LCD according to the present exemplary embodiment, a first subpixel electrode 82a' is surrounded by a $j^{th}$ data line $D_j$ and a second subpixel electrode 82b'. A first drain electrode 66a' and a second source electrode 65b' overlap a portion of the second subpixel electrode 82b and are connected to the first subpixel electrode 82a'.

Since the first drain electrode 66a' and the second source electrode 65b' are disposed on a different layer than the first subpixel electrode 82a' and thus, are insulated from the first subpixel electrode 82a', they may partially overlap the second subpixel electrode 82b'. The first drain electrode 66a' and the second source electrode 65b' may be parallel to the $j^{th}$ data line $D_j$.

The first subpixel electrode 82a is substantially triangular and is surrounded by the second subpixel electrode 82b'. The second subpixel electrode 82b' may be adjacent to first and second TFTs $Q_1$' and $Q_2$', and the second subpixel electrode 82b' may be disposed between the first subpixel electrode 82a' and an $i^{th}$ gate line $G_i$.

It will be apparent to those skilled in the art that various modifications and variations can be made in the present invention with out departing from the spirit or scope of the invention. Thus, it is intended that the present invention cover the modifications and variations of this invention provided they come with in the scope of the appended claims and their equivalents.

What is claimed is:

1. A liquid crystal display (LCD), comprising:
  a substrate;
  a plurality of gate lines that extend in a first direction on the substrate;
  a plurality of data lines that cross the gate lines and extend in a second direction; and
  a plurality of unit pixels defined by the gate lines and the data lines,
  wherein each unit pixel comprises:
  a first subpixel electrode connected to a data line by a first switching device, a gate electrode of the first switching device being connected to the $i^{th}$ gate line;
  a second subpixel electrode connected to the a data line by a second switching device that is adjacent to the first switching device, the second subpixel electrode being spaced apart from the first subpixel electrode, a gate electrode of the second switching device being connected to the $i^{th}$ gate line; and
a third switching device including a drain electrode capacitively coupled to the second subpixel electrode and a source electrode connected to the first subpixel electrode, the third switching device being connected to an $(i+1)^{th}$ gate line that is adjacent to the ith gate line,
wherein the first subpixel electrode and the second subpixel electrode between the ith gate line and the $(i+1)^{th}$ gate line are arranged in an order opposite that of the first subpixel electrode and the second subpixel electrode between the $(i+1)^{th}$ gate line and an $(i+2)^{th}$ gate line.

2. The LCD of claim 1, wherein the data lines comprise a first data line to deliver a data voltage to a unit pixel connected to the $i^{th}$ gate line and a second data line to deliver a data voltage to a unit pixel connected to the $(i+1)^{th}$ gate line.

3. The LCD of claim 2, wherein the third switching device of the unit pixel connected to the $i^{th}$ gate line and the first switching device and the second switching device of the unit pixel connected to the $(i+1)^{th}$ gate line are switched on or off in response to a gate voltage received from the $(i+1)^{th}$ gate line.

4. The LCD of claim 1, wherein a first unit pixel comprises the first switching device and the second switching device connected to the $i^{th}$ gate line and the third switching device connected to the $(i+1)^{th}$ gate line,
wherein a second unit pixel comprises a first switching device and a second switching device connected to the $(i+1)^{th}$ gate line, and
wherein the third switching device of the first unit pixel is spaced apart from the first switching device and the second switching device of the second unit pixel, the second unit pixel being adjacent to the first unit pixel in the first direction.

5. The LCD of claim 4, wherein the first switching device, the second switching device, and the third switching device connected to the $(i+1)^{th}$ gate line are arranged in an order opposite that of the first switching device, the second switching device, and the third switching device connected to the $(i+2)^{th}$ gate line.

6. The LCD of claim 1, wherein the first switching device and the second switching device are simultaneously switched on or off in response to the gate voltage received from the $i^{th}$ gate line.

7. The LCD of claim 1, wherein the source electrode does not overlap the second subpixel electrode.

8. The LCD of claim 7, wherein the source electrode is parallel to the data lines.

9. The LCD of claim 7, wherein the second subpixel electrode comprises a tapered, indented portion,
wherein a portion of the first subpixel electrode is arranged in the indented portion of the second subpixel electrode, and
wherein another portion of the first subpixel electrode extends adjacent to the $i^{th}$ gate line or the $(i+1)^{th}$ gate line and parallel to the drain electrode of the third switching device.

10. The LCD of claim 1, wherein the drain electrode is parallel to the data lines.

11. The LCD of claim 1, further comprising a storage electrode that overlaps the drain electrode.

12. The LCD of claim 11, wherein the first subpixel electrode and the second subpixel electrode are spaced apart from each other by a slit, and the storage electrode at least partially overlaps the slit.

13. The LCD of claim 12, wherein the drain electrode and the second subpixel electrode form a voltage-up capacitor, which raises a voltage charged in the second subpixel electrode, and the drain electrode and the storage electrode form a voltage-down capacitor, which lowers a voltage charged in the first subpixel electrode.

14. The LCD of claim 1, wherein the third switching device faces the first switching device and the second switching device and is spaced apart from the first switching device and the second switching device with the first subpixel electrode and the second subpixel electrode disposed therebetween.

15. An LCD comprising a plurality of unit pixels defined by a plurality of gate lines and a plurality of data lines arranged in a lattice on an insulating substrate,
wherein each unit pixel comprises:
a first subpixel electrode connected to a data line by a first switching device, a gate electrode of the first switching device being connected to the $i^{th}$ gate line;
a second subpixel electrode connected to the a data line by a second switching device that is adjacent to the first switching device, the second subpixel electrode being spaced apart from the first subpixel electrode, a gate electrode of the second switching device being connected to the $i^{th}$ gate line; and
a third switching device comprising a drain electrode capacitively coupled to the second subpixel electrode, a source electrode connected to the first subpixel electrode, and a gate electrode connected to an $(i+1)^{th}$ gate line,
wherein the unit pixels comprise a first unit pixel, in which the first switching device and the second switching device of the first unit pixel are connected to the $i^{th}$ gate line and a $j^{th}$ data line, and a second unit pixel, in which the first switching device and the second switching device of the second unit pixel are connected to the $i+1^{th}$ gate line and a $(j+1)^{th}$ data line, and
wherein the first subpixel electrode and the second subpixel electrode of the first unit pixel are arranged in an order opposite that of the first subpixel electrode and the second subpixel electrode of the second unit pixel.

16. The LCD of claim 15, wherein the first unit pixel and the second unit pixel are adjacent to each other in a direction in which the data lines extend.

17. The LCD of claim 15, wherein the third switching device of the first unit pixel and the first switching device and the second switching device of the second unit pixel are spaced apart from each other and are switched on or off in response to a gate voltage received from the $(i+1)^{th}$ gate line.

18. The LCD of claim 16, wherein the first switching device, the second switching device, and the third switching device of the first unit pixel are arranged in an order opposite that of the first switching device, the second switching device, and the third switching device of the second unit pixel.

19. The LCD of claim 16, wherein the $j^{th}$ data line applies a data voltage to the first switching device and the second switching device connected to the $i^{th}$ gate line, and the $(j+1)^{th}$ data line applies a data voltage to the first switching device and the second switching device connected to the $(i+1)^{th}$ gate line.

20. The LCD of claim 16, wherein the source electrode of the third switching device does not overlap the second subpixel electrode.

21. The LCD of claim 18, wherein the second subpixel electrode comprises a tapered, indented portion,
wherein a portion of the first subpixel electrode is arranged in the indented portion of the second subpixel electrode, and wherein another portion of the first subpixel electrode extends adjacent to the $i^{th}$ gate line or the $(i+1)^{th}$ gate line and parallel to the drain electrode of the third switching device.

22. The LCD of claim 15, wherein the source electrode and the drain electrode are parallel to the data lines.

23. The LCD of claim 15, further comprising a storage electrode that overlaps the drain electrode.

24. The LCD of claim 23, wherein the first subpixel electrode and the second subpixel electrode are spaced apart from each other by a slit, and the storage electrode at least partially overlaps the slit.

25. The LCD of claim 23, wherein the drain electrode and the second subpixel electrode form a voltage-up capacitor, which raises a voltage charged in the second subpixel electrode, and the drain electrode and the storage electrode form a voltage-down capacitor, which lowers a voltage charged in the first subpixel electrode.

26. A liquid crystal display (LCD), comprising:
a substrate;
a plurality of gate lines that extend in a first direction on the substrate;
a plurality of data lines that cross the gate lines and extend in a second direction; and a plurality of unit pixels defined by the gate lines and the data lines,
wherein each unit pixel comprises:
a first subpixel electrode connected to a data line by a first switching device, a gate electrode of the first switching device being connected to the $i^{th}$ gate line;
a second subpixel electrode connected to the a data line by a second switching device that is adjacent to the first switching device, the second subpixel electrode being spaced apart from the first subpixel electrode, a gate electrode of the second switching device being connected to the $i^{th}$ gate line; and
a third switching device including a drain electrode capacitively coupled to the second subpixel electrode and a source electrode connected to the first subpixel electrode, the third switching device being connected to an $(i+1)^{th}$ gate line that is adjacent to the $i^{th}$ gate line.

* * * * *